March 3, 1959 M. K. HAYNES Re. 24,614

MAGNETIC CORE LOGICAL CIRCUITS

Original Filed July 30, 1953

INVENTOR.
MUNRO K. HAYNES
BY
William V. Sahlberg
AGENT

United States Patent Office

Re. 24,614
Reissued Mar. 3, 1959

24,614

MAGNETIC CORE LOGICAL CIRCUITS

Munro K. Haynes, Dutchess County, N. Y., assignor to International Business Machines Corporation, New York, N. Y., a corporation of New York Original No. 2,695,993, dated November 30, 1954, Serial No. 371,239, July 30, 1953. Application for reissue May 4, 1955, Serial No. 506,101

17 Claims. (Cl. 340—174)

Matter enclosed in heavy brackets [ ] appears in the original patent but forms no part of this reissue specification; matter printed in italics indicates the additions made by reissue.

This invention relates to pulse transfer circuits and more particularly to circuits which are adapted to perform logical operations on binary digits.

Logical circuits are employed throughout accounting equipment and computers for widely different purposes and are variously known as gates, buffers, coincidence circuits and the like. This invention is directed to a particular type of logical circuit termed an "exclusive or" circuit. Such a circuit is one having a plurality of input terminals and a single output terminal at which a pulse is produced when a pulse is applied to one and only one of the input terminals. Considering a circuit with two input terminals, then no output pulse is produced when both input terminals receive pulses or when neither receive input pulses.

Electronic computers employ a large number of vacuum tubes and, while such tubes may have long life individually, where large numbers are employed, the likelihood of failure of one tube is quite great. In many instances, the failure of only a single tube may completely disable the unit and as a consequence, there has been a trend in computer research generally to replace vacuum tube circuits with components which are more reliable, have longer life and are more economical.

Accordingly, it is an object of my invention to provide an "exclusive or" logical circuit which is more economical, uses fewer elements and is more reliable in operation than comparable circuits using vacuum tubes.

A more specific object of this invention is to provide an "exclusive or" circuit utilizing magnetic binary elements for performing logical operations.

Another object of the invention is to provide an improved "exclusive or" circuit having negligible power consumption and requiring only low voltage bias sources for operation.

Still another object is to provide an "exclusive or" circuit utilizing magnetic elements which is capable of storing binary information in addition to performance of the logical circuit operation.

Another object of the invention is to provide an "exclusive or" circuit adapted to receive input pulses over a selectable time interval and to produce an output indication at a selectable time.

Other objects of the invention will be pointed out in the following description and claims and illustrated in the accompanying drawings, which disclose, by way of example, the principle of the invention and the best mode, which has been contemplated, of applying that principle.

Magnetic material having the property of low coercive force and high residual magnetism may be readily magnetized in one direction or one remanence state representative of a binary "one" and in the opposite state representative of a binary "zero." A core fabricated of such materials may be placed in one of these two states of remanence by means of windings on the core to which pulses are applied, and the particular state existing within a core may be determined by a voltage pulse induced in other windings on the core when the flux state is reversed. An ideal core material for this purpose would have a substantially rectangular hysteresis loop such as that illustrated in Fig. 1. With the binary "zero" state arbitrarily selected as point "a" on the curve, application of a positive magnetizing force H sufficiently greater than the coercive force $+H_1$ will cause the core to traverse the hysteresis loop to saturation point "b," and, on removal of the applied magnetomotive force, returns to point "c" which represents a binary "one" state. Similarly, when in a "one" remanence state, application of a negative magnetizing force H sufficiently greater than the coercive force $-H_1$ causes the core to traverse its hysteresis loop from point "c" to point "d" and, on removal, to point "a." The change in flux when the core is caused to go from the "one" state to the "zero" state or from the "zero" state to the "one" state, induces an output voltage pulse in each of the windings on the core, however, application of a magnetomotive force tending to maintain the core in either existing remanence state would ideally produce no flux change and consequentially, no output pulse would be produced. Due to the fact that core materials do not possess perfectly rectangular hysteresis loops, there is a flux change, for example, as the core goes from its stable negative remanence state "a" to its negative saturation state "d," during application of a read-out pulse, and a voltage of reduced magnitude is induced in the secondary windings. Provision is, therefore, made for discriminating between output pulses produced on reading out from a "zero" remanence state and on reading out from a "one" remanence state.

Figure 2:
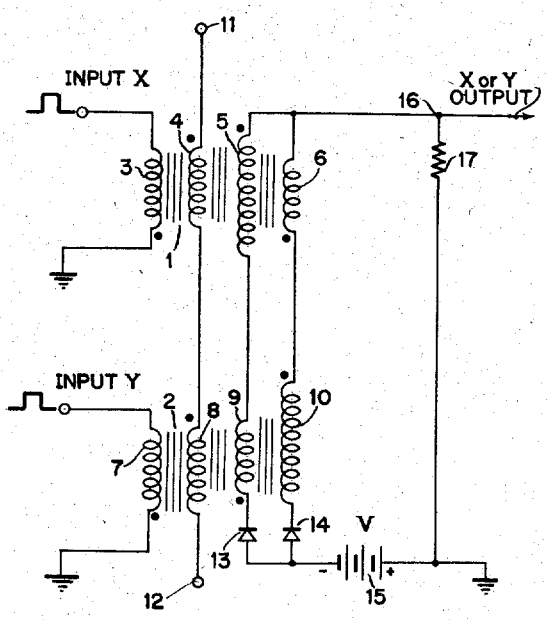
Fig. 2 is a schematic representation of an "exclusive or" circuit utilizing two bistable magnetic cores.

Referring now to Fig. 2, two bistable magnetic cores 1 and 2 are illustrated, each having four windings. A dot is placed at one end of each of these windings to indicate that that end has a negative polarity during read-in of a binary "one" and a positive polarity during read-out of a binary "one." Similar dots are placed near the windings in other schematic views.

Core 1 is provided with an input winding 3, read-out winding 4 and output windings 5 and 6. Core 2 is similarly provided with an input winding 7, read-out winding 8 and output windings 9 and 10. Input windings 3 and 7 are grounded at one end and the remaining ends comprise input terminals to which pulses X and Y respectively, are applied. Windings 4 and 8 are connected in series and are simultaneously pulsed during read-out by application of potential from a source (not shown) to terminals 11 and 12. Other circuit arrangements for pulsing the read-out windings simultaneously may be employed and parallel coupling of windings 4 and 8 is contemplated. The output windings 5 and 9 are connected in series with a diode 13 and windings 6 and 10 are connected in series with a diode 14. These two series branches are connected in parallel, with one junction of this parallel circuit coupled to the negative terminal of a voltage source 15 and the diodes 13 and 14 poled to prevent current flow from this source through the windings. The other junction of these paralleled branches is connected to an output terminal 16 and to one terminal of a load 17. The other load terminal and the positive terminal of source 15 are grounded as shown. Load 17 is represented schematically as a resistor, however, any load, such as the input winding of a further magnetic core, may be used.

The cores 1 and 2 are initially placed in a "zero" remanence state (point "a" in Fig. 1) by application of a current pulse through the windings 4 and 8 in a direction as indicated by the dot adjacent these windings (negative on read-in). Application of a positive input pulse X to winding 3 now causes a flux to be produced in core 1 such that it traverses its hysteresis loop from the "zero" state to the saturation state (point "a" to point "b" in Fig. 1). After the X read-in pulse terminates, the core 1 returns to and remains in the stable "one" remanence state (point "c" of Fig. 1) and a binary one is now stored in core 1.

The flux change caused by the X read-in pulse causes a voltage to be induced in each of the windings 4, 5 and 6 and the polarity of these induced voltage pulses is negative at the dot marked ends of these windings. Considering winding 4, terminals 11 and 12 appear as an open circuit except during read-out time and no current flows through this winding. The polarity of the voltage developed in winding 5 is such that current flow is blocked by the diode 13. However, the polarity of the voltage developed in winding 6 is such that current flow is in the low resistance direction of diode 14 but opposed by the source 15. The number of turns of winding 6 and the potential of source 15 are adjusted so that the voltage V of the latter opposes the voltage induced in winding 6 to such a degree that no current or at least a current of only negligible magnitude flows through the load 17 during read-in of the X pulse.

Core 1 is now in a "one" state and core 2 is in a "zero" state as a result of the presence of an X input pulse and the absence of a Y input pulse. According to the definition heretofore given of an "exclusive or" circuit, this condition should produce an output pulse during read-out time.

Figure 1:
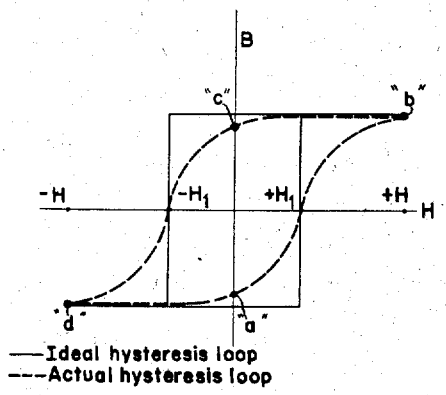
Fig. 1 is a diagram of an actual and ideal hysteresis loop for core material used in a magnetic binary element.

Current is caused to flow through both windings 4 and 8 on read-out and is applied in a direction to produce a negative magnetizing force —H in cores 1 and 2 which is sufficient to cause them to return to state "a" (Fig. 1) representing storage of a binary "zero." Since core 2 is in a "zero" storage state, no flux reversal takes place in this core due to read-out current in winding 8 and no voltage, ideally, is developed in either of the output windings 9 and 10. Core 1, however, is storing a binary "one" and energization of winding 4 causes a voltage to be induced in windings 5 and 6. The polarity of the voltage induced in winding 6, as indicated by the dot, is such that current flow is blocked by the diode 14. The voltage induced in winding 5, however, is in such a direction of polarity as to cause current flow through the diode 13 and also through the threshold voltage source 15 in a charging direction. The number of turns of winding 5 are adjusted so that a voltage having a range of magnitude between the values V and 2V is induced therein which will result in a voltage having a value between zero and V appearing across load 17 when opposed by the bias voltage V of source 15. The current path for this induced voltage may be traced from the dot marked end of winding 5, which is positive on read-out, to the terminal 16, load 17, the positive terminal of the source 15 and overcoming this bias voltage of magnitude V, through the diode 13, winding 9 of core 2 and back to the negative terminal of winding 5. The voltage drop across load 17 is substantially the difference between the induced voltage and the bias battery voltage and has a polarity such that the end connected to terminal 16 is positive. The actual voltage developed across the load 17 is further reduced by the drop through the low forward resistance of diode 13 and an opposing voltage of magnitude V, induced in winding 9 on read-out. The core 2, under the condition stated, is in a "zero" storage state and, on application of a negative read-out pulse to winding 8, has a negative magnetizing force also applied, causing core 2 to go from point "a" to point "d" (Fig. 1). Since the core material does not have an ideal rectangular hysteresis loop, there will be a small flux change in going from point "a" to point "d" and a voltage of small magnitude V is, therefore, produced in winding 9 and has a polarity such as to oppose that induced in winding 5.

Application of the read-out pulse, therefore, produces an output pulse which may have a magnitude substantially as great as V across load 17, fulfilling a first requirement for an "exclusive or" logical circuit, and has reset cores 1 and 2 to a binary "zero" state.

In a similar manner, an output pulse is produced on the condition that an input pulse Y is applied to winding 7 and pulse X is not applied to winding 3. In this case, however, the core 2 will store a binary "one" and application of a read-out pulse to terminals 11 and 12, energizing windings 4 and 8, develops a voltage having a range magnitude between the values V and 2V across winding 10 and a voltage which may have a magnitude V or greater across winding 9, as determined by the number of turns of these windings. The diode 13 is poled in such a direction that current cannot flow due to the voltage developed in winding 9, however, the voltage induced in winding 10 causes current flow through a path traced from the dot marked end of this winding, through winding 6 of core 1, opposed by an induced voltage V, to the terminal 16 and through load 17 to the grounded positive side of source 15, thence through the source 15 in a charging direction and through the diode 14 to the negative terminal of winding 10. A voltage which may be substantially of magnitude V, depending upon the number of turns of winding 10, thus is developed across load 17 and is of the same polarity as that developed as a result of the X pulse alone.

An "exclusive or" circuit must also produce no output if neither input pulse X or Y is present. Under this condition, both cores 1 and 2 are in a "zero" state or at point "a" on their hysteresis loops (Fig. 1). Application of the read-out pulse causes each of these cores to go from point "a" to point "d" and a small voltage will be induced in each of the windings due to this flux change. Winding 5 has a voltage within the range V to 2V developed while winding 9 has a voltage up to a value V which opposes that induced in winding 5 and, since the net induced voltage V is less than the bias source voltage V, no current flows through the load 17. Winding 10 of core 2 has a voltage within the range V to 2V developed which is opposed by a voltage up to a value V induced in winding 6 of core 1. The net induced voltage V is also less than the opposing bias voltage V from source 15 and no current flows through load 17.

In order to satisfy the remaining condition for an "exclusive or" circuit, an output signal must not be produced if both input pulses X and Y are present. X and Y pulses may be applied simultaneously or at separate times and, as pointed out heretofore, no spurious outputs are obtained for separate read-in conditions. With simultaneous read-in, both cores 1 and 2 being in the "zero" state, a voltage having an upper range substantially of magnitude V is induced in both windings 6 and 9 and a voltage between the values V and 2V is induced in windings 5 and 10. It will be recalled that the dot notation adjacent the ends of these windings indicates a negative polarity on read-in operations and the algebraic sum of the voltages induced in windings 5 and 9 is such that the resultant voltage is opposed by the diode 13. Similarly, the algebraic sum of the voltages induced in windings 6 and 10 is such that the resultant voltage is opposed by the diode 14. No spurious response, therefore, is produced during simultaneous read-in or in any read-in operation.

We have yet, however, to consider the condition that no output pulse is to be produced across the load on reading out cores 1 and 2 when both are in a "one" remanence state as when both X and Y input pulses have been received.

With the cores in a stored remanence state (point c of Fig. 1), a read-out pulse now causes a voltage having a magnitude up to the value V to be induced in both winding 6 of core 1 and winding 9 of core 2 and a voltage having a magnitude between the values V and 2V is induced in winding 5 of core 1 and winding 10 of core 2. The algebraic sum of the voltages induced in windings 5 and 9 is applied in the low resistance direction of diode 13 but is opposed by the threshold bias voltage V of source 15. Likewise the algebraic sum of the voltages developed in windings 6 and 10 is applied in the low resistance direction of diode 14 but is also opposed by the threshold bias voltage V of source 15. Hence, the diodes do not conduct and no current flows through the load 17 and no output is obtained with both X and Y inputs applied.

It will be noted that the voltages induced in windings 6 and 9 during read-in cores 1 and 2 respectively are of such polarity that current will tend to flow through diode 14 and 13 unless prevented by the threshold bias of source 15. These induced voltages, therefore, are made equal to or less than the bias voltage V in order to prevent the appearance of an output pulse through load 17 during read-in.

The turns ratio of windings 5 and 10 are adjusted so as to be somewhat greater than that of the windings 6 and 9 up to a ratio of two to one and, during read-in, voltages having a magnitude of 2V or less are developed. The voltage developed in either of these windings when only one input is applied (X or Y pulse) is prevented from flowing through the load 17 by the diodes 13 or 14. Read-in of both X and Y pulses simultaneously causes voltages of 2V or less to be induced in windings 5 and 10 which are opposed to the voltage induced in windings 9 and 6. The resultant voltages of V or less are then blocked by the diodes 14 and 13.

During read-out, the voltages developed in windings 6 and 9 are in opposition to the voltages developed in windings 10 and 5 respectively. With only a single input pulse previously applied and stored, the opposition is negligible and the 2V or less voltage developed in the winding 10 or 5 is sufficient to produce a pulse of magnitude V or less across the load. With both pulses X and Y stored, the voltages induced in windings 6 and 9 are opposed to the voltages induced in windings 10 and 5 and must result in an algebraic sum equal to or less than the voltage V of the bias source in order to prevent a spurious output voltage across the load 17. It is thus seen that the bias voltage V of source 15 must be made equal to or greater than that induced in either winding 6 or 9 on read-in and the more nearly equal these voltages are, the greater the output response obtained.

Also, the bias voltage V must be made greater than the resultant voltage induced in windings 5 and 9 and the resultant voltage induced in windings 10 and 6 on read-out. In other words, for maximum output signal, the voltages developed in windings 6 and 9 are desirably less on read-in and greater on read-out as compared with the fixed voltage V. This may be accomplished by adjusting the number of turns of the read-in and read-out windings or by using a read-in pulse of lower driving power than the read-out pulse since the time rate of flux change, and consequently the voltage developed, is dependent upon the driving power.

It is thus seen that the circuit of Fig. 2 meets all the requirements of an "exclusive or" circuit and, as the read-out pulses may be applied at any selected time interval after read-in is completed, this circuit is also capable of storing binary information in addition to performing the logical operation.

Figure 3:
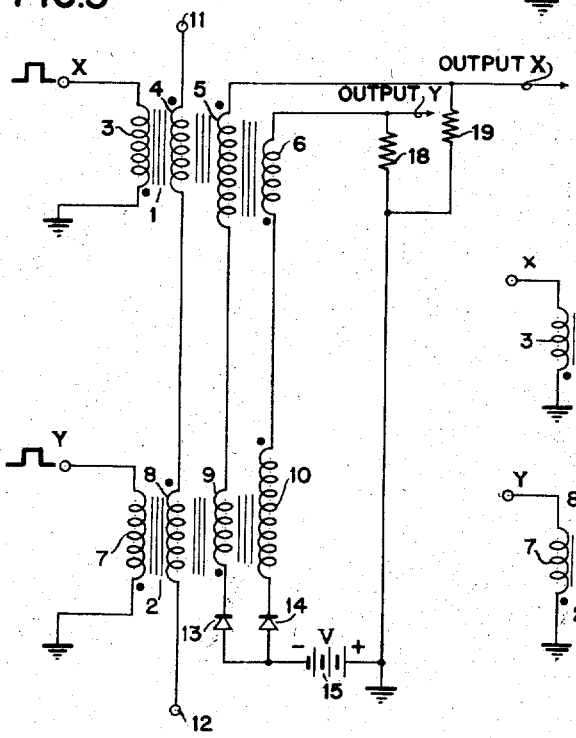
Fig. 3 is a schematic illustration of another form of circuit embodying the invention.

Referring to the modification illustrated in Fig. 3, two loads labelled 18 and 19 are employed with windings 5 and 9 connected in series with load 19 and windings 10 and 6 connected in series with load 18. In this manner the circuit of Fig. 3 is capable of indicating if the input X alone, or input Y alone, had been previously stored. Read-out of only an X input pulse develops a voltage of V or less across load 19 while read-out of only a Y input pulse develops a voltage V or less across load 18.

The bias voltage V as represented by the battery 15 in both Figures 2 and 3 may be supplied by any equivalent voltage source acting in continuous opposition to the diodes 13 and 14 and providing a reliable threshold voltage which must be exceeded by some predetermined amount in order to produce a significant current flow through the load 17 or loads 18 and 19. The battery symbol employed is intended to represent any source of steady bias voltage having a low internal impedance. It should be noted that the source 15 does not furnish any power and may thus be employed to supply bias potential for a large number of circuits such as that shown.

Figure 4:
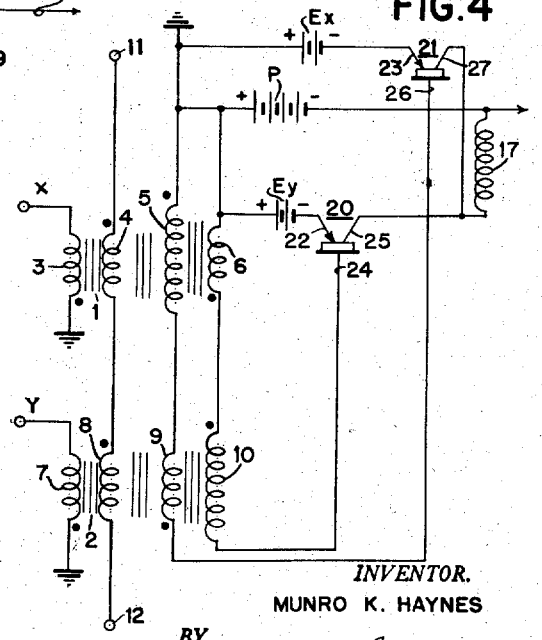
Fig. 4 illustrates still another embodiment of the invention in which transistors are employed.

Figure 4 illustrates a circuit adapted to store binary information and perform logical operations similar to the foregoing embodiments except that in this instance the threshold voltage is maintained by germanium transistors 20 and 21 or other semi-conductor amplifiers. Emitters 22 and 23 are biased by fixed voltage sources Ex and Ey respectively with emitter 22 and base 24 of transistor 20 connected in series with source Ey and the windings 6 and 10. The positive terminal of source Ey and a second voltage source P are grounded and the negative terminal of the latter is connected through load 17 to collector 25 of transistor 20. The connections for transistor 21 and windings 5 and 9 with the sources Ex and P and with the load 17 are made in a similar manner as described for the transistor 20 and windings 6 and 10.

Considering read-in of an X pulse, a voltage is induced in winding 5 in a direction additive to the bias of source Ex, and emitter 23 is made more negative with respect to base 26 so that no conduction takes place. A voltage is induced also in winding 6 which is insufficient to overcome the bias source Ey and transistor 20 does not conduct.

Reading in both an X and Y pulse simultaneously induces voltages in windings 5, 6, 9 and 10 such that the emitters 22 and 23 are biased more negatively and conduction does not occur.

Reading out a stored X pulse, according to the definition heretofore made of an "exclusive or" circuit, will produce an output pulse through load 17. In this case, a voltage is induced in winding 5 which is in a direction to overcome the bias of source Ex and the emitter 23 is raised in potential with respect to base 26 and conduction takes place between base 26 and collector 27. Power is now supplied from the source P during the read-out interval and flows through winding 17. Little power is consumed, however, due to the amplification of transistor 21.

Read-out of a stored Y pulse operates in a similar manner with power supplied by source P through collector 25 of emitter 20.

Considering read-out of both X and Y pulses, which, according to the definition, should not give an output pulse in load 17, voltages are induced in the read-out direction in each of the windings 5, 6, 9 and 10. The voltages induced in windings 6 and 10 are opposed with the net voltage equal to or less than the bias voltage of source Ey so that transistor 20 does not conduct and the voltages induced in windings 5 and 9 are in opposition with the net voltage less than or equal to the bias voltage of source Ex so that transistor 21 does not conduct.

It is evident that electron tubes can be used to establish and maintain a reliable threshold voltage for discriminating between pulses of variable magnitude, however, crystal diodes as shown in Figures 2 and 3 and transistors as shown in Figure 4, are reliable devices which have negligible power consumption and require only low voltage bias sources for their operation.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. An "exclusive or" logical circuit comprising at least two magnetic storage elements, each including a core of magnetic material capable of assuming alternate states of magnetic stability representative of binary "zero" and "one" conditions, a read-in winding on each core adapted to be pulsed for causing the storage element to assume a binary "one" state, a read-out winding on each core adapted to be pulsed for resetting the storage element to a "zero" state, first and second output windings on each core wherein voltage pulses are induced in response to change in the magnetic state of the storage element, said first output windings having a turns ratio greater than that of said second windings and wound in opposing directions, circuit means connecting the first winding on said first core in series with the second winding on said second core and the second winding on said first core in series with the first winding on said second core, fixed bias voltage source means, and means coupling said series connected windings in parallel and in series with said fixed bias source and a load, said coupling means including devices electrically conductive in one direction only.

2. Apparatus as set forth in claim 1 wherein said electrically conductive devices are diodes connected in opposition to said fixed bias source means.

3. Apparatus according to claim 1 wherein said electrically conductive devices are transistors adapted to pass an electrical pulse only when said storage elements are singly reset to a "zero" binary state from a "one" binary state.

4. An "exclusive or" circuit comprising first and second magnetic storage devices capable of assuming alternate states of magnetic stability representative of "zero" and "one" binary conditions, read-in means associated with said first device and adapted to cause said first device to assume a binary "one" state, read-in means associated with said second device and adapted to cause said second device to assume a binary "one" state, read-out means associated with said devices and adapted to cause said devices to assume binary "zero" states, first and second output windings associated with each of said devices, fixed bias voltage means, circuit means connecting the first winding of said first device in series with the second winding of the second device and the second winding of said first device in series with the first winding of said second device, and means coupling said series connected windings and said fixed bias means in series with a load, said coupling means including elements electrically conductive in one direction only.

5. Apparatus according to claim 4, wherein said coupling means comprises diodes biased by said source so as to pass a voltage pulse only when said first and second devices are singly caused to assume a binary "zero" state from a binary "one" state on application of a current pulse to said read-out means.

6. Apparatus according to claim 4, wherein said coupling means comprises semi-conducting amplifiers adapted to pass an electrical impulse only when said first and second devices are singly caused to assume a binary "zero" state from a binary "one" state on application of a current pulse to said read-out means.

7. A logical circuit comprising a plurality of magnetic storage elements each adapted to assume one of two stable magnetic states, means for selectively causing said elements to assume a first stable state, means for resetting said elements simultaneously to a second stable state, secondary windings on said elements in which voltages of opposed polarity and different magnitude are induced when the respective storage elements are reset from a first stable state to a second stable state, a voltage responsive load device, means series connecting secondary windings of unlike polarity and magnitude on at least two of said storage elements, fixed bias voltage means, and circuit means including unidirectional current conducting means connected in opposition to said fixed bias voltage means and coupling said series connected secondary windings in parallel and in series with said load device.

8. Apparatus according to claim 7 wherein said unidirectional current conducting means comprise diodes biased by said voltage means to pass a voltage pulse through said load device only when one of said storage elements is reset from a first to a second stable magnetic state.

9. Apparatus according to claim 8 wherein said unidirectional conducting means comprises semi-conducting amplifiers adapted to pass an electrical impulse only when one of said storage elements is reset from a first to a second stable magnetic state.

10. A logical circuit comprising two magnetic storage elements each adapted to assume one of two stable magnetic states, means for selectively causing said elements to assume a first stable state, means for resetting said elements simultaneously to a second stable state, secondary windings on said elements in which voltages of opposed polarity and different magnitude are induced when the respective storage elements are reset from one to the other stable state, a pair of voltage responsive load devices, means connecting the secondary windings on one core in series with the secondary windings on the other core which are of unlike polarity and magnitude, means including a diode connecting each of said pairs of windings in series individually with one of said load devices, and fixed bias means jointly coupling said load devices and said pairs of windings in such a manner that said diodes prevent current flow through said windings from said fixed bias source.

11. An "exclusive or" logical circuit comprising at least two magnetic storage elements, each including a core of magnetic material having alternate states of magnetic stability representative of binary "zero" and "one" conditions, a read-in winding on each core adapted to be pulsed for causing the storage element to assume a binary "one" state, a read-out winding on each core adapted to be pulsed for resetting the storage element to a "zero" state, first and second output windings on each core wherein voltage pulses are induced in response to change in the magnetic state of the storage element, said first output windings having a turns ratio approximately twice that of said second windings and wound in opposing directions, circuit means connecting the first winding on said first core in series with the second winding on said second core and the second winding on said first core in series with the first winding on said second core, fixed bias voltage source means, and means coupling said series connected windings in parallel and in series with said fixed bias source and a load, said coupling means including devices electrically conductive in one direction only.

12. Apparatus as set forth in claim 11 wherein said electrically conductive devices are diodes connected in opposition to said fixed bias source means.

13. Apparatus according to claim 11 wherein said electrically conductive devices are transistors adapted to pass an electrical pulse only when said storage elements are singly reset to a "zero" binary state from a "one" binary state.

14. A logical circuit comprising two magnetic storage elements each adapted to assume one of two stable magnetic states, means for selectively causing said elements to assume a first stable state, means of lower driving power for resetting said elements simultaneously to a second stable state, secondary windings on said elements in which voltages of opposed polarity and different magnitude are induced when the respective storage elements are reset from one to the other stable state, a pair of voltage responsive load devices, means connecting the secondary windings on one core in series with the secondary windings on the other core which are of unlike polarity and magnitude, means including a diode connecting each of said pairs of windings in series individually with one of said load devices, and fixed bias means jointly coupling said load devices and said pairs of windings in such a manner that said diodes prevent current flow through said windings from said fixed bias source.

*15. A saturable core exclusive or logical circuit comprising a pair of storage elements each including a core of magnetic material capable of assuming alternate states of magnetic stability, a read-in winding on each core adapted to be pulsed for causing the storage element to assume one magnetic state, a read-out winding on each core adapted to be pulsed for resetting the storage element to the other magnetic state, first and second oppositely poled output windings on each said core wherein voltage pulses are induced in response to a change in the magnetic state of the storage element, circuit means connecting the output windings of said pair of cores in series opposition, and means coupling said series connected pairs of windings in parallel and to a load device for developing an output signal when only one of said cores is reset to the other magnetic state.*

*16. A saturable core exclusive or logical circuit comprising a pair of storage elements each including a core of magnetic material capable of assuming alternate states of magnetic stability, a read-in winding on each core and individual thereto adapted to be pulsed for causing the storage element to assume one magnetic state, a read-out winding on each core adapted to be pulsed for resetting the storage element to the other magnetic state, an output winding on each said core wherein voltage pulses are induced in response to a change in the magnetic state of the storage element, circuit means connecting said output windings in series opposition in series with a load device for developing a unipolar output signal thereacross when only one of said cores is reset to the other magnetic state.*

*17. An exclusive or logical circuit comprising two magnetic cores capable of assuming alternate states of magnetic stability, first winding means on each of said core and individual thereto for selectively causing one of said stable states to be assumed, second winding means on each said core operable for simultaneously causing each said core to assume the other stable state, third winding means on each said core wherein a voltage is developed in response to a change from said one to said other stable state on operation of said second winding means, and circuit means connecting said third winding means in series opposition and in series with a load device whereupon an output signal voltage is developed across said load when a given one of said cores is in said other stable state and said second winding means is operated.*

References Cited in the file of this patent or the original patent

UNITED STATES PATENTS

| | | |
|---|---|---|
| 2,596,199 | Bennett | May 13, 1952 |
| 2,696,347 | Lo | Dec. 7, 1954 |

OTHER REFERENCES

Publication I, Proc. of Assoc. for Computing Mach., May 1952 (pp. 223–229).

Thesis by M. K. Haynes, pp. 36–43, Dec. 28, 1950.